(12) United States Patent
Kuybeda et al.

(10) Patent No.: US 10,699,386 B2
(45) Date of Patent: Jun. 30, 2020

(54) TECHNIQUES FOR SCENE-BASED NONUNIFORMITY CORRECTION IN SHUTTERLESS FIR CAMERAS (71) Applicant: Adasky, Ltd., Yokneam Illit (IL)

(72) Inventors: Oleg Kuybeda, Boyds, MD (US); Eyal Madar, Haifa (IL); Assaf Weissman, Moreshet (IL)

(73) Assignee: Adasky, Ltd., Yokneam Illit (IL)

(*) Notice: Subject to any disclaimer, the term of this patent is extended or adjusted under 35 U.S.C. 154(b) by 0 days.

(21) Appl. No.: 16/058,643

(22) Filed: Aug. 8, 2018

(65) Prior Publication Data
US 2019/0005625 A1    Jan. 3, 2019

Related U.S. Application Data (63) Continuation-in-part of application No. 15/989,779, filed on May 25, 2018.
(Continued)

(51) Int. Cl.
*H04N 5/33* (2006.01)
*G06T 5/00* (2006.01)
(Continued)

(52) U.S. Cl.
CPC ............. *G06T 5/003* (2013.01); *G06T 5/002* (2013.01); *G06T 7/0002* (2013.01); *G06T 7/20* (2013.01); *G06T 7/254* (2017.01); *H04N 5/33* (2013.01); *H04N 5/3656* (2013.01); *G06T 2207/10048* (2013.01); *G06T 2207/20208* (2013.01)

(58) Field of Classification Search
CPC .... H04N 5/33; H04N 5/2176; H04N 5/23229; H04N 5/243; H04N 5/3651; G06T 2207/10048; G06T 5/002; G06T 5/003; G06T 7/0002; G06T 7/20; G01J 2005/068;
(Continued)

(56) References Cited

U.S. PATENT DOCUMENTS 5,053,870 A   10/1991 Ito et al.
5,323,334 A   6/1994 Meyers et al.
(Continued)

OTHER PUBLICATIONS

International Search Report and Written Opinion of International Searching Authority for PCT/US2018/034620, ISA/RU, Moscow, Russia, dated Aug. 27, 2018.
(Continued)

*Primary Examiner* — Jonathan R Messmore
(74) *Attorney, Agent, or Firm* — M&B IP Analysts, LLC (57) ABSTRACT A system and method for correcting nonuniformity in far-infrared (FIR) images captured by a shutterless FIR camera. The method includes determining a noise of a current image based on updating a noise estimate of a previous image with a noise estimate of a current image; determining a weight mask matrix of the current image, where the weight matrix includes high values corresponding to pixels of the current image in which noise estimation is facilitated, and low values corresponding to pixels of the current image in which noise estimation is inhibited; applying the weight mask matrix to the current image; and correcting the nonuniformity of the current image incrementally based on the determined noise of current image and the applied weight mask matrix.

21 Claims, 6 Drawing Sheets

Related U.S. Application Data (60) Provisional application No. 62/552,620, filed on Aug. 31, 2017, provisional application No. 62/543,108, filed on Aug. 9, 2017, provisional application No. 62/543,108, filed on Aug. 9, 2017, provisional application No. 62/526,733, filed on Jun. 29, 2017, provisional application No. 62/515,200, filed on Jun. 5, 2017.

(51) Int. Cl.
*G06T 7/20* (2017.01)
*G06T 7/00* (2017.01)
*H04N 5/365* (2011.01)
*G06T 7/254* (2017.01)

(58) Field of Classification Search
CPC .. G01J 5/06; G05D 1/0242; G05D 2201/0213
See application file for complete search history.

(56) References Cited

U.S. PATENT DOCUMENTS

| | | | |
|---|---|---|---|
| 5,414,439 | A | 5/1995 | Groves et al. |
| 6,759,949 | B2 | 7/2004 | Miyahara |
| 7,199,366 | B2 | 4/2007 | Hahn et al. |
| 7,683,321 | B1 | 3/2010 | King et al. |
| 7,786,898 | B2 | 8/2010 | Stein et al. |
| 8,067,735 | B2 | 11/2011 | King et al. |
| 8,208,026 | B2 | 6/2012 | Högasten et al. |
| 8,378,290 | B1 | 2/2013 | Speake et al. |
| 8,384,783 | B2 | 2/2013 | Strandemar et al. |
| 8,503,821 | B2 | 8/2013 | Hogasten |
| 8,562,776 | B2 | 10/2013 | Liberman et al. |
| 8,743,207 | B2 | 6/2014 | Boulanger et al. |
| 8,981,966 | B2 | 3/2015 | Stein et al. |
| 9,143,703 | B2 | 9/2015 | Boulanger et al. |
| 9,251,595 | B2 | 2/2016 | Bailey et al. |
| 9,292,909 | B2 | 3/2016 | Högasten et al. |
| 9,508,124 | B2 | 11/2016 | Bailey et al. |
| 9,565,371 | B2 | 2/2017 | Johansson et al. |
| 9,635,220 | B2 | 4/2017 | Foi et al. |
| 9,681,066 | B2 | 6/2017 | Strandemar |
| 2003/0007074 | A1 | 1/2003 | Nagaoka et al. |
| 2006/0279632 | A1 | 12/2006 | Anderson |
| 2008/0197284 | A1 | 8/2008 | Ebenstein et al. |
| 2010/0111412 | A1* | 5/2010 | Hogasten ............... G06T 5/50 382/167 |
| 2012/0312976 | A1 | 12/2012 | Boulanger et al. |
| 2012/0320217 | A1 | 12/2012 | Högasten |
| 2012/0321212 | A1 | 12/2012 | Högasten et al. |
| 2013/0218500 | A1 | 8/2013 | Durand et al. |
| 2014/0015921 | A1 | 1/2014 | Foi et al. |
| 2014/0016879 | A1 | 1/2014 | Högasten et al. |
| 2014/0037225 | A1 | 2/2014 | Högasten et al. |
| 2014/0092257 | A1 | 4/2014 | Hogasten et al. |
| 2014/0198218 | A1* | 7/2014 | Afrooze ............... H04N 5/235 348/229.1 |
| 2014/0270563 | A1* | 9/2014 | Bailey ............... G06T 5/005 382/254 |
| 2014/0354825 | A1 | 12/2014 | Johansson et al. |
| 2014/0355904 | A1 | 12/2014 | Olsson |
| 2015/0009335 | A1 | 1/2015 | Strandemar |
| 2015/0226613 | A1 | 8/2015 | Bauer et al. |
| 2015/0312488 | A1 | 10/2015 | Kostrzewa et al. |
| 2015/0332441 | A1 | 11/2015 | Högasten et al. |
| 2015/0350567 | A1 | 12/2015 | Parrish et al. |
| 2015/0355026 | A1 | 12/2015 | Iguchi et al. |
| 2016/0104048 | A1 | 4/2016 | Stein et al. |
| 2016/0203694 | A1 | 7/2016 | Högasten et al. |
| 2017/0103279 | A1 | 4/2017 | Hong et al. |
| 2017/0150070 | A1 | 5/2017 | Johansson et al. |
| 2017/0262995 | A1 | 9/2017 | Li et al. |

OTHER PUBLICATIONS

International Search Report and Written Opinion of International Searching Authority for PCT/US2018/039987, ISA/RU, Moscow, Russia, dated Oct. 16, 2018.

Choi, et. al., "Convolutional Recurrent Neural Networks for Music Classification", Fast IMPACt EPSRC Grant EP/L019981/1 and the European Commission H2020 Research and Innovation Grant AudioCommons, arXiv: 1609.04243, vol. 1, Sep. 14, 2016.

Liang, et. al., "Recurrent Convolutional Neural Network for Object Recognition", IEEE: State Key Laboratory of Intelligent Technology and Systems, TNlist, CBICR, 978-1-4673-6964-0/15, 2015, pp. 3367-3375.

\* cited by examiner

TECHNIQUES FOR SCENE-BASED NONUNIFORMITY CORRECTION IN SHUTTERLESS FIR CAMERAS

CROSS-REFERENCE TO RELATED APPLICATIONS

This application claims the benefit of U.S. Provisional Application No. 62/543,108 filed on Aug. 9, 2017. This application is also a continuation-in-part (CIP) of U.S. patent application Ser. No. 15/989,779 filed on May 25, 2018. The Ser. No. 15/989,779 Application claims priority to: U.S. Provisional Application No. 62/515,200 filed on Jun. 5, 2017; U.S. Provisional Application No. 62/543,108, filed on Aug. 9, 2017; U.S. Provisional Application No. 62/552,620, filed on Aug. 31, 2017; and the 62/526,733 Application, filed on Jun. 29, 2017. All of the applications referenced above are hereby incorporated by reference.

TECHNICAL FIELD

The present disclosure relates generally to operating shutterless far-infrared (FIR) cameras and, more specifically, to removing residual nonuniformity in such cameras.

BACKGROUND

Thermal infrared (IR) cameras capture images using light with wavelengths in the range of seven and a half to fourteen micrometers. A typical IR camera uses an infrared sensor (or detector) to detect infrared energy that is guided to the sensor through the camera's lens. IR cameras can be utilized for a variety of imaging applications including, but not limited to, object detection and segmentation, passive motion detection, night vision, thermal mapping, health care, building inspection, surveillance, and the like. Recently, an attempt has been made in the IR industry to integrate IR cameras in advanced driver assistance systems and autonomous vehicle systems.

The application, and hence the type of camera, may depend on the infrared spectrum used. The infrared spectrum lies outside of the visible light range and consists of a near infrared section (NIR), with wavelengths of 0.75-1.0 micrometers ($\mu m$); a short infrared section (SWIR) with wavelengths of 1-3.0 micrometers ($\mu m$); a mid-Infrared section (MIR), with wavelengths of 3.0-5.0 $\mu m$; and a far-infrared (FIR) section, with wavelengths of 7.5-14.0 $\mu m$.

One type of FIR sensor are uncooled bolometric detectors. They have a small form factor and can be typically mass-produced using low-cost technology. In a typical arrangement, an uncooled sensor does not require a cryo-cooler for proper operation, but does require a shutter for frequent calibration. A shutter is a mechanical element placed between the lens and the FIR sensor designed to block incident scene radiation typically used for image nonuniformity correction. Generally, a shutter is composed of a flat-bladed flag, a sleeve, and an arm that connects the sleeve to the flag. The flag opens and closes at predefined time intervals.

Each detector within the FIR sensor is very sensitive to temperature changes that may result either from thermal radiation of the outside scene, i.e., the image of interest, or from the internal, or ambient, camera radiation, causing parasitic ambient drift. Since each detector has a slightly different responsivity to ambient temperature, the ambient drift pattern adds a random offset to each pixel that persists between different video frames and changes as a function of ambient temperature. Ambient drift removal is one of the crucial steps in proper image processing of thermal cameras. Without properly and completely rectifying this ambient drift, the output image includes a residual unwanted noise pattern, or residual nonuniformity.

Even after ambient drift is removed from an image, there often remains residual noise present in the scene. This residual nonuniformity can often be visually discernible to a human eye. Removing or mitigating such noise can be difficult and complicated.

A shutter is often used during a flat-field correction (FFC) procedure to address ambient drift, as well as the residual nonuniformity. During the FFC, the shutter presents a uniform temperature source to the FIR sensor. By capturing the flat-field source radiation, the camera can update the offset correction coefficients, which results in a more uniform image. The duration of the FFC procedure is a few hundred milliseconds, during which the image captured just prior to the shutter blocking the field of view is frozen until the FFC process is completed, when the shutter is reopened. The shutter-based FFC must occur every few minutes for proper calibration.

While using a shutter may improve the quality and accuracy of the thermal image captured by an FIR sensor, having a blackout period of hundreds of milliseconds is not acceptable in certain applications. For example, using a shutter-based FIR camera in advanced driver assistance systems and autonomous vehicle systems can pose a high risk, as the camera must frequently freeze for a few hundred milliseconds, an unacceptable amount of down time for driving situations. In addition, shutters include moving parts that wear out over time. This may cause a camera to malfunction during use and shorten the life of the camera.

The FIR camera designed for advanced driver assistance systems and autonomous vehicle systems should meet additional constraints other than safety. Such constraints include a small form factor, accurate and low latency image processing, and low-power consumption. Moreover, the presence of a shutter requires a larger camera body and additional energy to power the shutter movement. Thus, currently available FIR cameras, and in particular, shutter-based FIR cameras, are not well adapted for automotive applications.

While there are some manufacturers who produce shutterless cameras where calibration data is used for scene-based nonuniformity correction, merely relying on calibration performed during the manufacturing process often leads to inaccurate results. This is because the output of a FIR senor, and hence the camera, also depends on the current internal (ambient) camera radiation, which is known as parasitic ambient drift. Additionally, applying corrections based on calibration tables fall short of sufficiently correcting for residual nonuniformity, which is difficult to model.

It would therefore be advantageous to provide a solution to correct residual nonuniformity present in images, after applying calibration tables and performing ambient drift correction, in shutterless FIR cameras.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for correcting nonuniformity in far-infrared (FIR) images captured by a shutterless FIR camera. The method includes: determining a noise of a current image based on updating a noise estimate of a previous image with a noise estimate of a current image; determining a weight mask matrix of the current image, where the weight matrix includes high values corresponding to pixels of the current image in which noise estimation is facilitated, and low values corresponding to pixels of the current image in which noise estimation is inhibited; applying the weight mask matrix to the current image; and correcting the nonuniformity of the current image incrementally based on the determined noise of the current image and the applied weight mask matrix.

Certain embodiments disclosed herein also include a non-transitory computer readable medium having stored thereon instructions for causing a processing circuitry to perform a process, the process including: determining a noise of a current image based on updating a noise estimate of a previous image with a noise estimate of a current image; determining a weight mask matrix of the current image, where the weight matrix includes high values corresponding to pixels of the current image in which noise estimation is facilitated, and low values corresponding to pixels of the current image in which noise estimation is inhibited; applying the weight mask matrix to the current image; and correcting the nonuniformity of the current image incrementally based on the determined noise of the current image and the applied weight mask matrix.

Certain embodiments disclosed herein also include an electronic circuit integrated in a shutterless far-infrared (FIR) camera and configured to process FIR images, including: a processing circuitry; and a memory, the memory containing instructions that, when executed by the processing circuitry, configure the electronic circuit to: determine a noise of a current image based on updating a noise estimate of a previous image with a noise estimate of a current image; determine a weight mask matrix of the current image, where the weight matrix includes high values corresponding to pixels of the current image in which noise estimation is facilitated, and low values corresponding to pixels of the current image in which noise estimation is inhibited; apply the weight mask matrix to the current image; and correct the nonuniformity of the current image incrementally based on the determined noise of the current image and the applied weight mask matrix.

BRIEF DESCRIPTION OF THE DRAWINGS

The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example to the disclosed embodiments of techniques for correcting fixed pattern noise (FPN), including residual nonuniformity, a shutterless far-infrared (FIR) camera is provided. In shutter-based cameras, FPN correction is based on 2-points correction, which provides knowledge for non-uniform pixel gains (obtained during camera calibration) and offsets (obtained by using a shutter having a uniform temperature). According to the disclosed embodiments, no shutter is used. Pixel offsets are estimated by analyzing smooth or uniform image areas, which are automatically detected within video frames. As a scene changes, the locations of the smooth regions migrate, which, after a sufficient period of time, allows the algorithm to correct offset errors (e.g. the residual noise) in the entire image.

Figure 1:
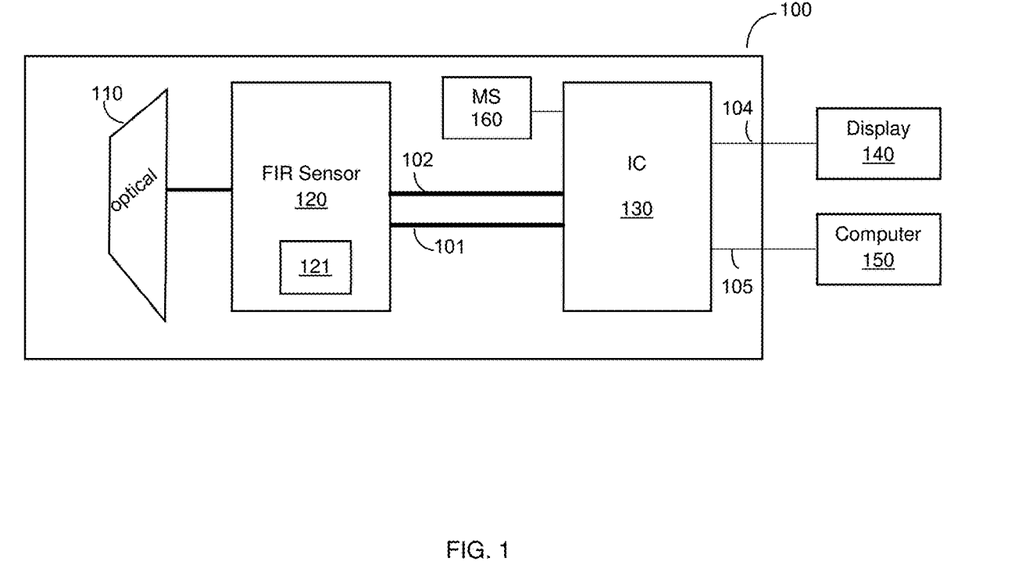
FIG. 1 is a block diagram of an FIR camera structured according to one embodiment.

FIG. 1 shows an example block diagram of an FIR camera 100 utilized to describe the various disclosed embodiments. The FIR camera 100 includes an optical unit 110 and a FIR sensor 120 coupled to an integrated circuit (IC) 130. The output of the FIR camera 100 is a video stream of thermal images (thermal video stream) captured by the FIR sensor 120 and processed by the IC 130.

In a configuration, two thermal video streams are output by the FIR camera 100. A first stream 104 includes thermal images captured by the FIR sensor 120 and processed by the IC 130 for the shutterless correction and image enhancement. As an example, the first thermal video stream 104 is an 8-bit grayscale video stream. The first thermal video stream 104 is fed to a display 140 which may be a screen disposed on a dashboard of a vehicle.

A second thermal video stream 105 is captured by the FIR sensor 120 and processed by the IC 130 for the shutterless nonuniformity correction of the FIR sensor 120. As an example, the second thermal video stream 105 is a 14-bit data stream that is fed to a computer 150 for computer vision processing. Specifically, the computer 150 may be configured to execute various computer vision algorithms related to advanced driver assistance and autonomous systems and applications. The algorithms may include, but are not limited to, detection of objects, obstacles, or hazards on a road. For example, the processed thermal video stream as output by the FIR camera 100 can be utilized for the detection of vehicles, pedestrians, animals, two-wheelers, black-ice spots, litter, debris, potholes, gully covers, curbs and so on.

As will be discussed below, the processing performed by the IC 130 enhances the quality of the captured thermal images to allow for the accurate and fast detection of objects, obstacles and hazards on the road. The processing by the IC 130 ensures passive detection of objects during daytime and nighttime in all weather conditions. To this end, the IC 130 is configured to perform one or more image processing tasks. One such task includes, but is not limited to, shutterless correction of the FIR thermal images captured by the FIR sensor 120.

As demonstrated in FIG. 1, the FIR camera 100 does not include a shutter (or any moving part that can be viewed as shutter). The shutterless correction executed by the IC 130 allows for the performance of a flat-field correction without the use of a shutter. That is, shutterless correction allows for an FIR image with unwanted noise removed therefrom.

It should be appreciated that the shutterless FIR camera 100 is mechanically reliable and meets safety standards required for advanced driver assistance and autonomous systems. Further, the absence of a shutter allows for an FIR camera design with a small form factor, as well as mechanical failure safety, as there is no need to include moving parts in the design.

In one configuration, the optical unit 110 includes one or more lens elements, each of which having a predetermined field of view. In an embodiment, the lens elements are chalcogenide. The lens may be protected by a protective window (not shown in FIG. 1). Further, to prevent icing of the optical unit 110 it may be covered by a heating means (not shown in FIG. 1). The heating means may include a wire or a coil.

The FIR sensor 120 is an uncooled FIR sensor. That is, the sensor 120 operates in the FIR (far-infrared) spectrum with a wavelength of 7.0 μm-14.0 μm. In an example configuration, the FIR sensor 120 is coupled through an input bus 101 to the IC 130 to input the captured FIR images and metadata. In an embodiment, a junction temperature sensor 121 is included in an enclosure of the FIR sensor 120 to measure the junction temperature therein.

A control bus 102 is also connected between the FIR sensor 120 and the IC 130. On the control bus 102, signals related to the status of the sensor 120, clock, synchronization, and other digital control signals are transferred. In an embodiment, the control bus 102 may carry analog signals indicating, for example, the current ambient temperature of the FIR sensor 120. Alternatively, the analog signal may not be part of the control bus 102.

The IC 130 includes a memory, a processing circuitry, and various circuits and modules configured for the execution of the tasks noted above. A detailed block diagram of the IC 130 is provided in FIG. 2. The IC 130 may be realized as a chipset, a system on a chip (SoC), a field programmable gate array (FPGA), a programmable logic device (PLD), an application specific integrated circuit (ASIC) or any other type of digital and/or analog hardware components.

The IC 130, and hence the FIR camera 100, operates in four different modes: calibration, power-on-test, function, and standby. The calibration mode is performed at a lab where the IC 130 executes a calibration process based on previous calibration points. During the process, the FIR camera 100 is stabilized at a predefined temperature and the ambient temperature is periodically read from the FIR sensor 120 to determine temperature stability.

In the power-on-test mode, the FIR camera 100 is checked, during its power-up sequence, if the various circuits of the IC 130 are operating properly. This includes, for example, performing internal self-tests for memories, logic monitors, and digital and analog components. In the function mode, the IC 130 performs image processing tasks and communicates with external systems and components (e.g., sensor and computer), as explained herein. In the standby mode, no image processing is performed, but there is live communication with external systems and components. The standby mode may be activated when the vehicle is not in motion or when the ADA is not engaged. In an embodiment, a motion sensor 160 is disposed within the FIR camera 100 and configured to detect when the camera is in motion.

The FIR sensor 120 and IC 130 are encapsulated in a thermal core (not shown). The thermal core is utilized to ensure a uniform temperature for the FIR camera 100. The temperature calibration of the thermal core is performed during the calibration mode. The optical unit 110 is typically assembled in the FIR camera 100 after the FIR sensor 120 and IC 130 are encapsulated in the thermal core.

Figure 2:
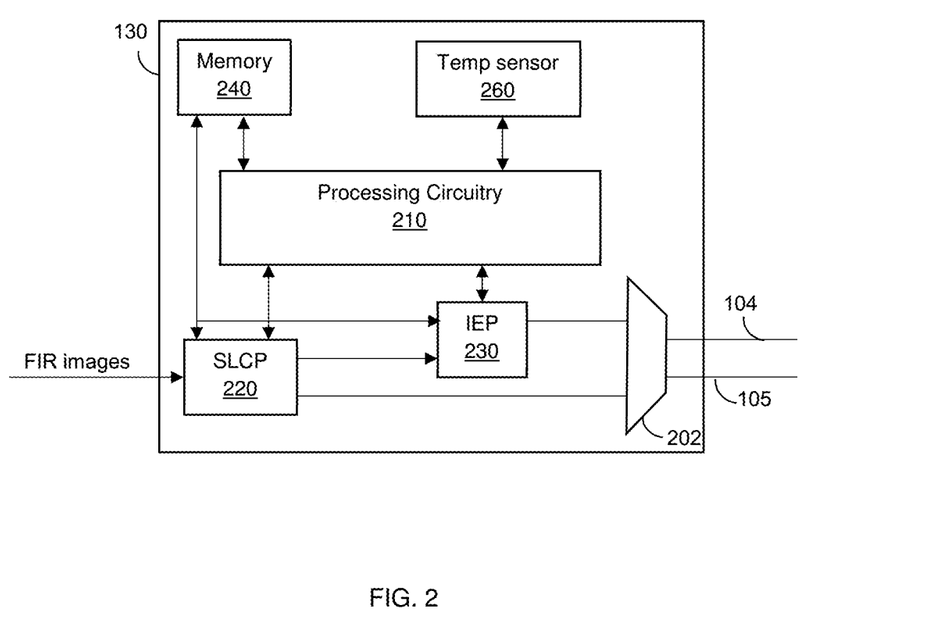
FIG. 2 is a block diagram of an IC integrated in the FIR camera of FIG. 1 according to an embodiment.

FIG. 2 shows an example block diagram of the IC 130 designed according to one embodiment. The IC 130 includes a processing circuitry 210, a shutterless correction processor (SLCP) 220 and an image enhancing processor (IEP) 230 that are configured to execute the various image processing tasks described herein. The IC 130 further includes a memory 240, and a temperature sensor 260.

The IC 130 interfaces with external elements, such as the computer 150 and display 140 of FIG. 1, through a multimedia link 202. In an example embodiment, the media link is a gigabit multimedia serial link (GMSL). As noted above, the IC 130 can be configured to output two thermal video streams of FIR images: a first stream (104) is processed by the SLCP 220 and output to the computer 150, and second stream (105) is processed by the SLCP 220 and the IEP 230 and output to the display 140. Both thermal video streams are output via the multimedia link 202.

In some optional embodiments, the IC 130 does not include the IEP 230. In such embodiments, shutterless correction is performed by the SLCP 220, and the output is fed to the computer 150. A configuration of the FIR camera 100 without the IEP 230 or with a single thermal video stream can be utilized in autonomous vehicle systems where a display may not be required.

In an embodiment, the memory 240 is configured to store calibration tables. The calibration tables include calibration values for each pixel computed in the lab. The calibration values may include residual nonuniformity reduction values for the purpose of overcoming irregularities in the FIR sensor.

The memory 240 may further store computer readable instructions to be executed by the processing circuitry 210, the SLCP 220 and the IEP 230. The computer readable instructions shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 210, the SLCP 220 and/or IEP 230, cause these processors to perform the various embodiments and tasks described herein. The memory 240 may be volatile (e.g., RAM, etc.), non-volatile (e.g., ROM, flash memory, etc.), or a combination thereof. The temperature sensor 260 measures the ambient temperature inside the enclosure of the FIR camera 100.

The processing circuitry 210 is configured to control the various elements of the IC 130. The processing circuitry 210 is further configured to power-up the FIR sensor 120, upload the initial calibration tables and set the FIR sensor 120, the SLCP 220, and the IEP 230 based on the parameter values in such tables. In an embodiment, the processing circuitry 210 periodically samples the noise produced from the FIR sensor 120, and uploads a set of calibration tables from the memory 240 that includes calibration values for the image. To allow for fast execution, some configuration tables can be uploaded in the background, i.e., during the processing of FIR images.

The SLCP 220 is configured to perform at least corrections for residual nonuniformity. The residual nonuniformity is corrected after applying drift correction based on the values in the calibration table as well as analyzing various areas within an image, such as smooth or homogenous regions.

The proposed scene-based nonuniformity correction uses the fact that the residual noise is composed of high-frequencies, as noise in each pixel is uncorrelated with noise in its neighbors. On the other hand, images of real scenes contain many smooth regions. Thus, based on the disclosed embodiments, the noise can be learned by detecting smooth regions in the image and estimating noise correction that would flatten such regions. Further, the noise is estimated incrementally where each image (frame) contributes only a small portion of the final result. As such, consistent FPN pattern are enhanced, while scene-related distortions are averaged out, because they are uncorrelated in the long run.

In order to furthermore avoid leakage of image or signal related information into the estimated residual noise pattern, a number of protection mechanisms are implemented. One mechanism inhibits learning in regions with very strong edges (i.e. limits the learning to smooth or uniform regions only). Another mechanism inhibits learning in regions that are invariable from frame to frame, or in whole frames that carry no significant changes c in some video segments. In such regions, the image contribution to the estimated noise will be correlated and, therefore, will not cancel over time. Therefore, the noise is estimated only in smooth and uniform regions that have a significant and uncorrelated signal dynamics throughout the video sequence.

To perform the scene-based nonuniformity correction, the SLCP 220 is configured to detect smooth regions to learn or otherwise estimate the noise patterns, detect if the FIR camera (hence the vehicle) is in motion (since the noise estimation is performed during motion only), and detect regions that undergo changes, as some regions will not change from frame to frame even during motion. According to some disclosed embodiments, the residual nonuniformity estimate within an image at a specific time ($D_t$) can be represented as follows:

$$D_t = F(D_{t-1}, D_{curr}) \qquad \text{Eq. 1}$$

where F is an incremental function that obtains $D_t$, the noise estimate at time t, by updating $D_{t-1}$, the noise estimate at time t−1 with $D_{curr}$, a small contribution of noise estimated using the current image. At time t=0, the value is $D_t$ is 0. It should be noted that $D_t$, $D_{t-1}$, and $D_{curr}$, are matrices having the size 'm' by 'n', for an image containing 'm' by 'n' pixels. In an embodiment, the noise of each pixel within the image is calculated, and thus each pixel is assigned a noise value.

In an example embodiment, the value $D_{curr}$ can be represented as follows:

$$D_{curr} = H(I_{curr}, D_{t-1}) \cdot M \qquad \text{Eq. 2}$$

where H is an operator that extracts high frequency noise by analyzing the current image $I_{curr}$, and the previous noise estimate $D_{t-1}$. In an embodiment, $D_{curr}$ is calculated by applying a nonlinear high-pass filter on $I_{curr}$. The computation of $D_{curr}$ is performed for every pixel in the image. In an embodiment, bad and saturated pixels are excluded from the computation by including them in the mask M. Here, the matrix M contains factors that weight pixels in the image that are designated to be included in the calculation of the residual nonuniformity present in the current image. In an example embodiment, the matrix M is based on a combination of four different factor matrices. In such an embodiment, M can be represented as follows:

$$M = M_{sat} \cdot M_b \cdot M_{edge} \cdot M_t \qquad \text{Eq. 3}$$

where $M_{sat}$ is a mask without over-saturated pixels, $M_b$ is a mask with pixels that are deemed to be "bad pixels" excluded," $M_{edge}$ contains weights that inhibit strong edges, and $M_t$ is a weight matrix inhibiting regions lacking temporal changes. All of $M_{sat}$, $M_b$, $M_{edge}$, $M_t$ are matrices. In an embodiment, M is a weight matrix with high values corresponding to pixels in which the noise estimation is facilitated and low values corresponding to pixels where the noise estimation is inhibited.

$M_{sat}$ and $M_b$, representing oversaturated and 'bad' pixels that have been identified by analyzing the image, have to be removed from the image regions used to calculate the scene-based nonuniformity correction. 'Bad pixels' are pixels within the image that are known a-priori to be defective. These pixels are removed from the calculation by applying a mask $M_b$ on the image. In contrast, $M_{edge}$ and $M_t$ inhibit "live" pixels that are determined to come from regions that have too strong edges, or are not sufficiently dynamic.

The matrix $M_{edge}$ is calculated by comparing a pixel to neighboring pixels, for example creating a qxq (q an integer greater than 1) matrix around the pixel, and determining if there is a significant gap in pixel value.

The matrix $M_t$ represents regions with limited changes between two a current image and a previous image. For example, if a low contrast depiction of a distant mountain in a first image stays stationary relative to the second image, the corresponding pixels area inhibited to reduce their contribution to the calculation, as they do not represent significant changes within the image. However, if a moving object within the foreground of the frame changes position between the first and the second image, those pixels are not inhibited, allowing calculation of noise from the changes within the image.

It should be noted that each of the SLCP 220 and IEP 230 may be realized as one or more hardware logic components and circuits. For example, and without limitation, illustrative types of hardware logic components that can be used include FPGAs, ASICs, ASSPs, SOCs, general-purpose microprocessors, microcontrollers, DSPs, and the like, or any other hardware logic components that can perform calculations or other manipulations of information.

Figure 3:
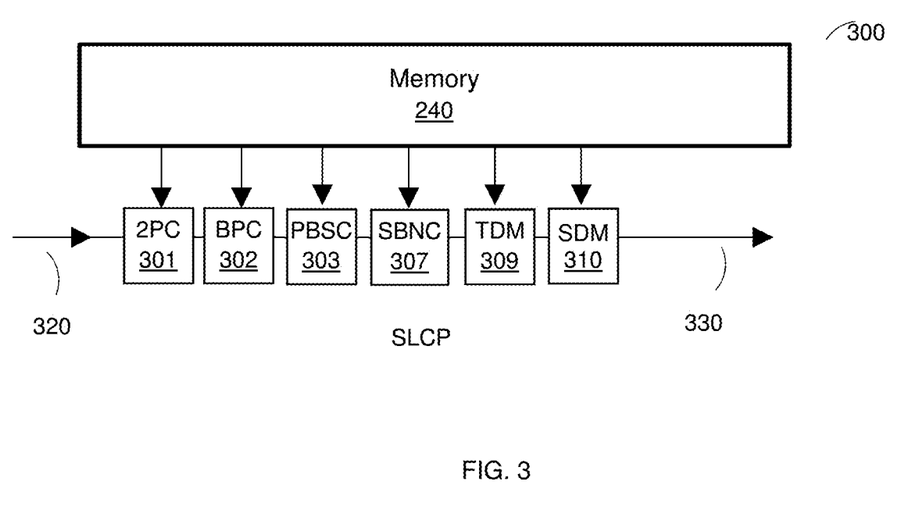
FIG. 3 shows a block drawing of an example pipeline for performing image processing tasks according to an embodiment.

FIG. 3 shows an example block drawing of an example pipeline 300 for performing various image processing tasks according to an embodiment. The input image is received at 320 to be processes by the SLCP.

A 2-points correction unit 301 receives an input image from the FIR sensor and the scene gain pattern (G) values and reference point offset (O) values from the memory 240. Based on this input information, a 2-points correction is performed by subtracting the reference point offset (O) value and dividing the result by the scene gain pattern (G) values. That is, an image output by the 2-points correction unit 301 can be represented as follows:

$$I_{2pt} = \frac{I_{in} - O}{G} \qquad \text{Eq. 4}$$

Next, a bad pixel correction (BPC) module 302 is configured to mask pixels designed in a bad pixel map. Such pixels do not meet the basic quality requirements as required by a manufacture of the FIR sensor. The bad pixels in the map can be identified by the manufacturer or during a test performed on the FIR sensor at the lab. The bad pixel map is saved in the memory 240. The pixel-based shutterless correction (PBSC) module 303 performs correction of the offset, gain and drift value for each pixel.

The scene-based nonuniformity correction (SBNC) module 307 performs the shutterless scene based and sunburn correction tasks discussed herein.

The time denoise module (TDM) 309 implements a process for time denoising of infrared video. The video obtained from the FIR sensor contains temporal noise of varying types, such as white noise, salt and pepper noise (occasional flickering) and row/columns noise. In an embodiment, the TDM module 309 is realized by an IIR filter with an adaptive threshold, and an anti-flickering mechanism. The time denoise module 309 compares the changes in pixel values from frame to frame to the estimated noise variance, to decide whether such values are caused by noise, or by some actual change in the scenery. Based on the comparison a signal to noise ratio is determined.

The spatial denoise module 310 is configured to denoise spatial noise. Such noise is caused due to internal electronic noise, errors in the pixel gains and offsets and drifts caused by temperature fluctuations. In an embodiment, the module 310 replaces each noisy pixel by weighted average of neighboring pixels. In an embodiment, only pixels having a gray level that is closer to a predefined gray level threshold are replaced. In an example embodiment, the output of the spatial denoise module 310 is a 14-bit grayscale video stream fed to the computer 150 (FIG. 1) and the IEP 230.

The resulting image is output 330 to an output device, such as the computer 150 or display 140 of FIG. 1. It should be noted that in certain configurations only some of the modules described are required as part of the processing.

It should be noted that the processing of the various modules shown in FIG. 3 is performed on infrared images input by the FIR sensors. The results images are still infrared images (referred herein as "FIR images"). Thus, the processing does not change the nature of the image (e.g., from an infrared to a visible spectrum image), but rather improves the quality of the infrared image.

Figure 4:
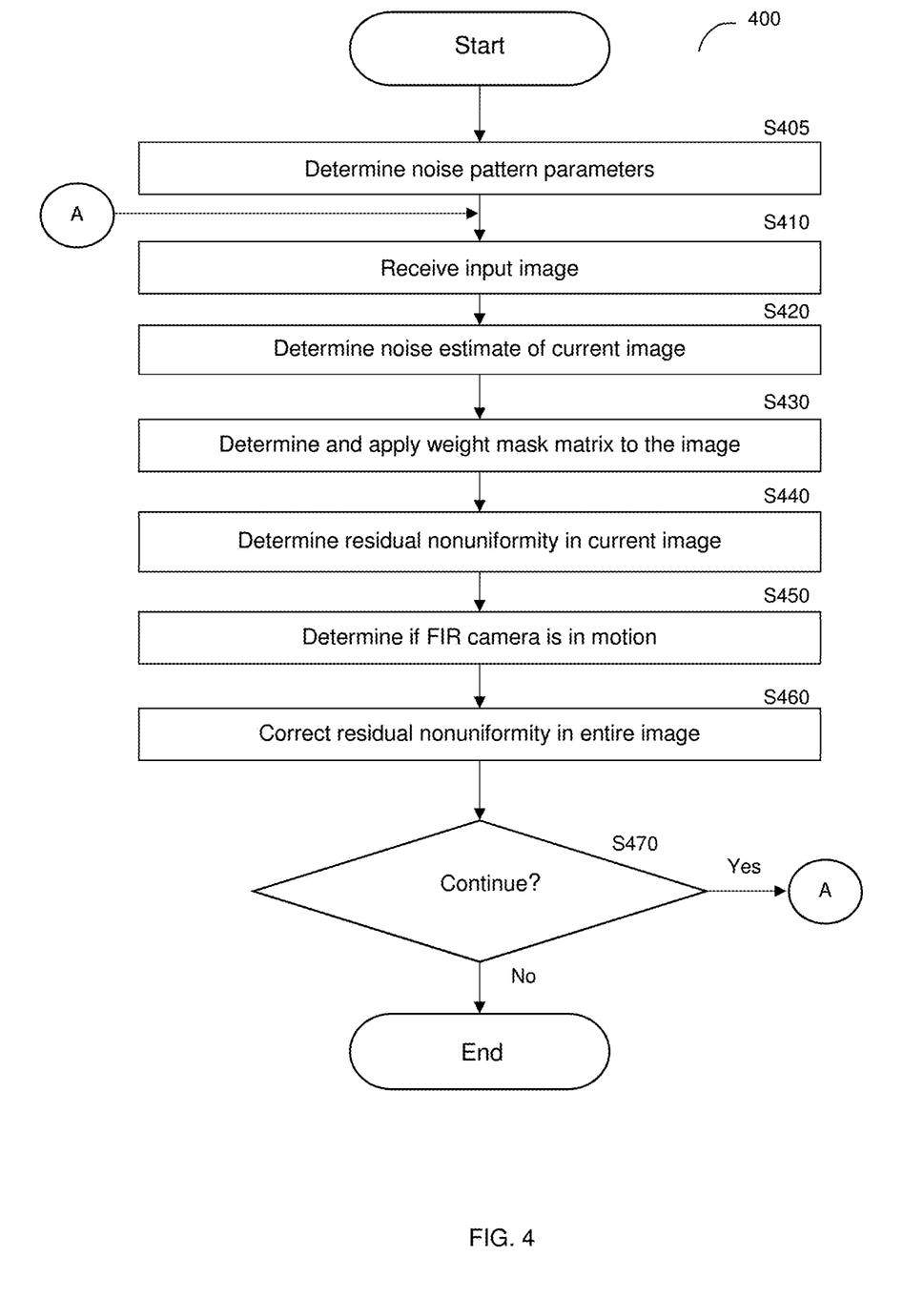
FIG. 4 shows a flowchart illustrating a method for correcting ambient drift according to an embodiment.

FIG. 4 shows an example flowchart 400 illustrating a method for correcting residual nonuniformity according to an embodiment.

At S405, a number of parameters utilized during the estimation of the noise patterns are determined. These parameters include, for example, a time parameter (t) determining a time interval for estimating the noise, the noise matrix $D_t$ at time t=0 is set to zero, and a learning rate parameter is set to a predefined value between 0 and 1.

At S410, a thermal image I is received from an FIR sensor, e.g. the FIR sensor 120 of FIG. 1. This may include receiving a stream of thermal images or a video frame. The method equally operates on thermal images that are received from the FIR sensor. In an embodiment, the thermal images are received after being corrected to remove at least gain, offset and drift errors from each pixel. Techniques for such corrections are discussed in detail in U.S. application Ser. No. 16/021,773 assigned to the common assignee.

At S420, the noise of a current image at time t is determined by updating $D_{t-1}$, the noise estimate of a previous image at time t−1, with $D_{curr}$, a contribution of noise estimated using the current image, as shown above in Equation 1. The noise of each pixel within the image is calculated, and each pixel is assigned a noise value. In an embodiment, S420 further includes applying a nonlinear high-pass filter to the current image, as defined in equation 2 above. In an embodiment.

At S430, a weighted mask matrix M of the current image is determined and applied to the current image. As noted above, the mask matrix includes weighted values to deemphasize or exclude saturated pixels, bad pixels, edge pixels or temporal changes within the image M based on weighted values for each pixel. While saturated pixels and bad pixels may be saved in the memory, edge pixels or temporal change related pixels are obtained via image processing. In an embodiment, the mask matrix is determined as described in Equation 3 above.

At S440, the residual nonuniformity is determined within the image based on the noise estimate and the applied weighted mask matrix. In an embodiment, the determined residual nonuniformity is stored within a memory for future retrieval.

At S450, it is determined whether the FIR camera is in motion. In one embodiment, the determination is based on an input received from the motion sensor integrated into the camera, e.g. the motion sensor 160 of FIG. 1. In another embodiment, the detection is based on processing the received image. For example, the state of motion can be calculated by comparing the current image with a previous image, and determining if the camera, or vehicle, is moving if a certain number of pixels in some regions have changed relatively to the previous image. In an embodiment, this determination is accomplished by calculating the percentage of changed pixels that is above a predetermined threshold.

If the camera is in motion, the determined $D_t$ value is considered and the image is corrected; otherwise, the determined $D_t$ value is ignored (i.e., $D_{t-1}$ is not set to $D_t$) and execution continues with S460. In an embodiment the nonuniformity of the current image is only corrected if it is determined that the FIR camera is in motion.

At S460, a correction is applied to the entire image. This is performed by subtracting the residual nonuniformity determined at S440 from the current image based on the weighted mask matrix. In an embodiment, the residual nonuniformity is further computed based on the determined smooth areas. The entire image can be incrementally covered as the smooth regions keep changing their location within the image.

At S470, it is checked if there are additional input images to correct and/or if the time interval t has been elapsed, if so the process returns to S410; otherwise, the process ends.

Figure 5A:
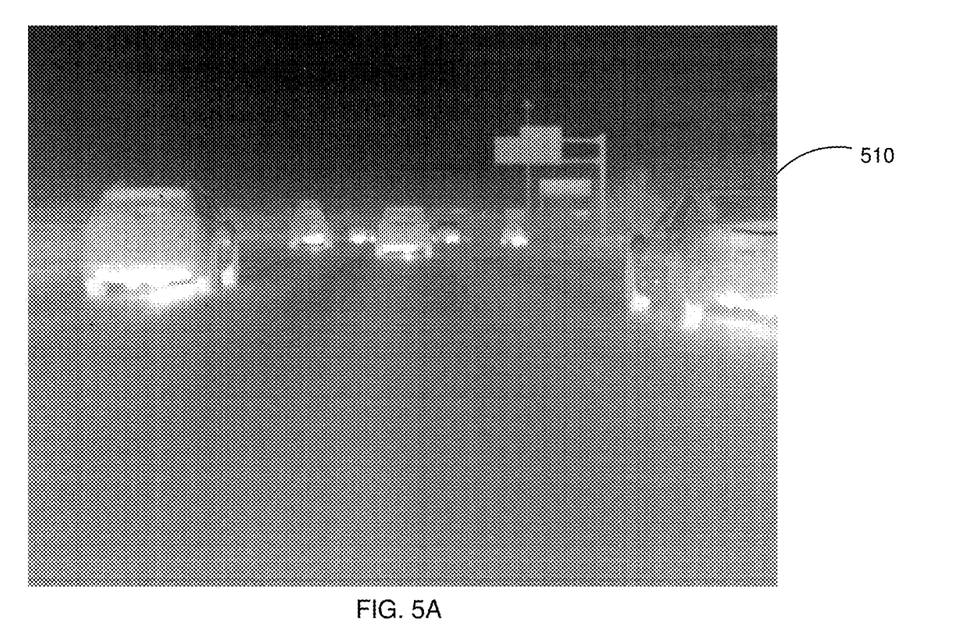
FIGS. 5A and 5B show example screenshots of an image before and after a scene-based nonuniformity correction has been applied thereto.
Figure 5B:
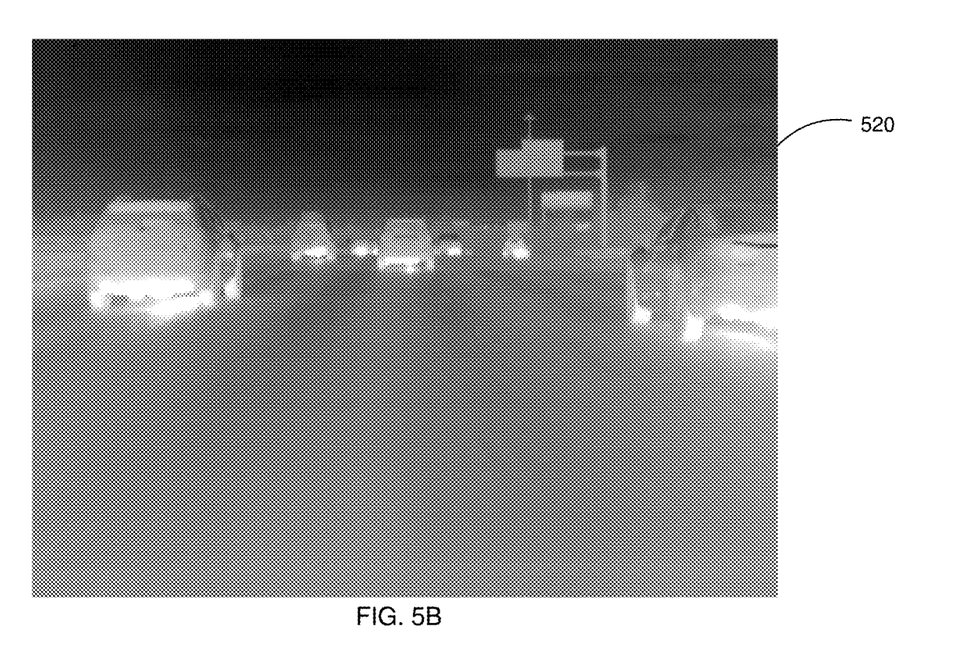
Figure 6:
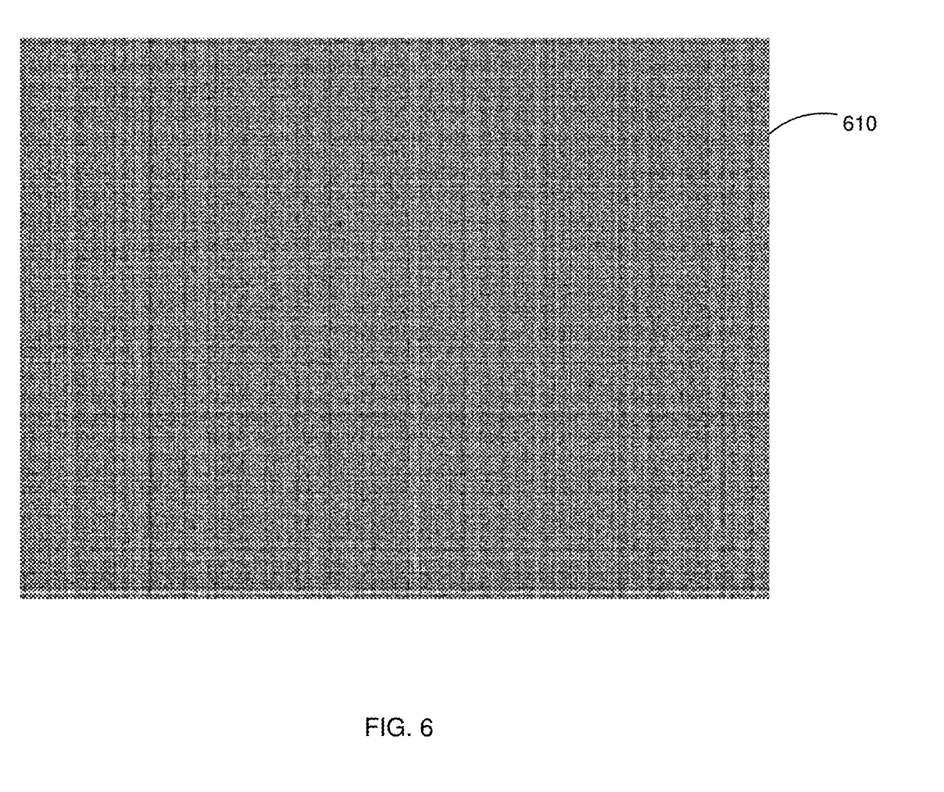
FIG. 6 shows a screenshot of the residual nonuniformity estimated by disclosed correction method on an image show in FIG. 5A.

FIGS. 5A and 5B show screenshots demonstrating the disclosed techniques in use. FIG. 5A shows an example input image have residual nonuniformity present before 510 correction and FIG. 5B after 520 a correction has been applied thereto. FIG. 6 shows an example image 610 representing, in part, the residual nonuniformity that has been estimated from the initial image 510 of FIG. 5A based on the techniques discussed herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

What is claimed is:

1. A method for correcting nonuniformity in far-infrared (FIR) images captured by a shutterless FIR camera, comprising:
    determining a noise of a current image based on updating a noise estimate of a previous image with a noise estimate of a current image;
    determining a weight mask matrix of the current image, where the weight mask matrix includes high values corresponding to pixels of the current image in which noise estimation is facilitated, and low values corresponding to pixels of the current image in which noise estimation is inhibited, wherein the low values inhibit pixels representing regions with limited changes between the current image and the previous image;
    applying the weight mask matrix to the current image; and
    correcting the nonuniformity of the current image incrementally based on the determined noise of the current image and the applied weight mask matrix.

2. The method of claim 1, wherein the noise estimate of the current image is calculated by applying a nonlinear high-pass filter to the current image.

3. The method of claim 2, wherein the nonlinear high-pass filter is configured to expose, within the current image, at least one of: a smooth area, a homogenous area and a dynamic area.

4. The method of claim 1, further comprising:
    determining if the shutterless FIR camera is in motion; and
    correcting the nonuniformity of the current image if it is determined that the shutterless FIR camera is in motion.

5. The method of claim 4, wherein the shutterless FIR camera is determined to be in motion if a percentage of pixels relative to a previous image have changed above a predetermined threshold.

6. The method of claim 1, wherein the weight mask matrix contains low values that inhibit oversaturated pixels.

7. The method of claim 1, wherein the weight mask matrix contains low values that inhibit pixels that are determined to come from regions within the current image that have strong edges.

8. The method of claim 7, wherein pixels with strong edges are determined by comparing pixels to neighboring pixels and determining if there is a significant gap in pixel value.

9. The method of claim 1, wherein the weight mask matrix contains low values that inhibit pixels within the current image that are known a-priori to be defective.

10. The method of claim 1, wherein the shutterless FIR camera is mounted on a moving vehicle.

11. A non-transitory computer readable medium having stored thereon instructions for causing a processing circuitry to perform a process, the process comprising:
    determining a noise of a current image based on updating a noise estimate of a previous image with a noise estimate of a current image;
    determining a weight mask matrix of the current image, where the weight mask matrix includes high values corresponding to pixels of the current image in which noise estimation is facilitated, and low values corresponding to pixels of the current image in which noise estimation is inhibited, wherein the low values inhibit pixels representing regions with limited changes between the current image and the previous image;
    applying the weight mask matrix to the current image; and
    correcting a nonuniformity of the current image incrementally based on the determined noise of the current image and the applied weight mask matrix.

12. An electronic circuit integrated in a shutterless far-infrared (FIR) camera and configured to process FIR images, comprising:
    a processing circuitry; and
    a memory, the memory containing instructions that, when executed by the processing circuitry, configure the electronic circuit to:
    determine a noise of a current image based on updating a noise estimate of a previous image with a noise estimate of a current image;
    determine a weight mask matrix of the current image, where the weight mask matrix includes high values corresponding to pixels of the current image in which noise estimation is facilitated, and low values corresponding to pixels of the current image in which noise estimation is inhibited, wherein the low values inhibit pixels representing regions with limited changes between the current image and the previous image;
    apply the weight mask matrix to the current image; and correct a nonuniformity of the current image incrementally based on the determined noise of the current image and the applied weight mask matrix.

13. The electronic circuit of claim 12, wherein the noise estimate of the current image is calculated by applying a nonlinear high-pass filter to the current image.

14. The electronic circuit of claim 13, wherein the nonlinear high-pass filter is configured to expose, within the current image, at least one of: a smooth area, a homogenous area and a dynamic area.

15. The electronic circuit of claim 12, wherein the processing circuitry is further configured to:
  determine if the shutterless FIR camera is in motion; and
  correct the nonuniformity of the current image if it is determined that the shutterless FIR camera is in motion.

16. The electronic circuit of claim 15, wherein the shutterless FIR camera is determined to be in motion if a percentage of pixels relative to a previous image have changed above a predetermined threshold.

17. The electronic circuit of claim 12, wherein the weight mask matrix contains low values that inhibit oversaturated pixels.

18. The electronic circuit of claim 12, wherein the weight mask matrix contains low values that inhibit pixels that are determined to come from regions within the current image that have strong edges.

19. The electronic circuit of claim 18, wherein pixels with strong edges are determined by comparing pixels to neighboring pixels and determining if there is a significant gap in pixel value.

20. The electronic circuit of claim 12, wherein the weight mask matrix contains low values that inhibit pixels within the current image that are known a-priori to be defective.

21. The electronic circuit of claim 12, wherein the shutterless FIR camera is mounted on a moving vehicle.

* * * * *